United States Patent
Brookes

(10) Patent No.: US 10,451,135 B2
(45) Date of Patent: Oct. 22, 2019

(54) AIR SPRING SLEEVES SWAGE ASSEMBLY

(71) Applicant: Firestone Industrial Products Company, LLC, Nashville, TN (US)

(72) Inventor: Graham R. Brookes, Noblesville, IN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 0 days.

(21) Appl. No.: 15/760,116

(22) PCT Filed: Sep. 15, 2016

(86) PCT No.: PCT/US2016/051832
§ 371 (c)(1),
(2) Date: Mar. 14, 2018

(87) PCT Pub. No.: WO2017/048895
PCT Pub. Date: Mar. 23, 2017

(65) Prior Publication Data
US 2018/0252288 A1 Sep. 6, 2018

Related U.S. Application Data

(60) Provisional application No. 62/218,867, filed on Sep. 15, 2015.

(51) Int. Cl.
*F16F 9/04* (2006.01)
*F16F 9/05* (2006.01)
*F16F 9/32* (2006.01)
*B60G 11/27* (2006.01)

(52) U.S. Cl.
CPC .......... *F16F 9/0454* (2013.01); *F16F 9/0463* (2013.01); *F16F 9/05* (2013.01); *F16F 9/3271* (2013.01); *B60G 11/27* (2013.01); *B60G 2206/42* (2013.01); *B60G 2206/8209* (2013.01); *F16F 2226/04* (2013.01); *F16F 2230/0005* (2013.01)

(58) Field of Classification Search
CPC .......... F16F 9/0454; F16F 9/05; F16F 9/3271; B60G 11/27
See application file for complete search history.

(56) References Cited

U.S. PATENT DOCUMENTS

2004/0026837 A1* 2/2004 Ferrer .................. F16F 9/0454
267/64.23

FOREIGN PATENT DOCUMENTS

EP 2090801 * 8/2009

* cited by examiner

Primary Examiner — Vishal R Sahni
(74) Attorney, Agent, or Firm — Taylor IP, P.C.

(57) ABSTRACT

A gas spring system (10), comprising: an end plate (12); a piston (14) laterally spaced from said end plate (12); a first flexible sleeve (16) having a first end (13) and a second end (15), said first end (13) of the first flexible sleeve (16) sealingly connected to the end plate (12); a second flexible sleeve (18) having a first end (17) and a second end (19), said first end (17) of the second flexible sleeve (18) sealingly connected to the piston (14); and a swage assembly (20) sealingly engaging the respective second ends (15, 19) of said first and second flexible sleeves (16, 18).

20 Claims, 2 Drawing Sheets

AIR SPRING SLEEVES SWAGE ASSEMBLY

BACKGROUND OF THE INVENTION

1. Field of the Invention

The present invention relates to air spring systems, and, more particularly, to a swaged assembly for constructing an air spring system.

2. Description of the Related Art

Pneumatic springs, commonly referred to as air springs, are used in numerous applications including motor vehicles. Air springs help to absorb shock loads in a vehicle as it traverses roadway undulations. Air springs can also help to maintain spacing between various components. In general, air springs typically consist of an internal pressurized fluid chamber within a flexible material, a rubber sleeve or bellows, which is capped at each end by a pair of end members. Usually, one end member is a piston that is movable relative to the bellows, and the other end member is an end cap, typically a bead plate that receives the pressurized air. The top bead plate is attached to the vehicle chassis. The piston is attached to the vehicle suspension system usually through a mounting stud that extends through the piston to a trailing arm.

Depending on the application, air springs can assume various configurations. Air springs can be generally categorized as either convoluted air springs or rolling lobe air springs. Convoluted air springs can have a single, double, or triple convolution. Typically, convoluted air springs have a shorter stroke, a greater spring rate and a higher load bearing capacity. To reinforce the convolutions a girdle ring is wrapped around the flexible member. Typical methods of sealing the flexible member to create a pressurized cavity include the crimped design and the sleeve type design. For the crimped design, the end members, usually bead plates, are crimped around the integrally formed bead ring of the flexible material. For the sleeve type design, the end members are attached to the flexible member by using external crimp rings that are swaged.

Rolling lobe air springs allow the flexible member to roll over onto the surface of its bottom end member, typically a piston, thereby forming an inverted lobe portion. Generally, rolling lobe air springs have a longer stroke, a lower spring rate, and a lower load bearing capacity compared to convoluted springs. As in convoluted air springs, to seal off the flexible member a bead plate may be used to crimp onto a bellows, or an end member may be swaged onto the flexible member. The general formula for calculating the spring rate of a rolling lobe type air spring can be found in U.S. Pat. No. 4,629,170. Rolling lobe air springs may also be in the form of a double rolling lobe, incorporating a second lobe at the top. The lobe at the top faces upwardly and may wrap around another piston or a modified end plate.

In operation, wheel fluctuations actuate the piston, which causes compression and expansion of the fluid within the chamber, causing the bellows to compress and expand. During compression (jounce travel), the pressure of the gas within the air spring increases. During extension (rebound travel), the pressure of the gas within the air spring decreases. This compression and extension of an air spring, expressed as a function of work (w=∫F·dx), allows for control of the ride characteristics of the equipment or vehicle as it experiences road shock. Air springs are often engineered to have a specific spring rate or spring constant, thereby controlling jounce and rebound characteristics for comfort and the desired application.

For a given application, the jounce and rebound characteristics of a double rolling lobe may be favored, but incorporating a double rolling lobe may be infeasible due to various design constraints. For instance, if the there is limited spacing the clearance needed to operate a double rolling lobe may be insufficient. Further, sediment and other foreign bodies may become lodged in the upwardly facing lobe. These foreign bodies can cause a loss of resiliance in the flexible member and may ultimately lead to air spring failure.

What is needed in the art is an improved air spring system that does not incorporate the design flaws of a double rolling lobe air spring.

SUMMARY OF THE INVENTION

The present invention provides an air spring system with a swage assembly.

The present invention in one form is directed to a gas spring system, comprising an end plate; a piston laterally spaced from said end plate; a first flexible sleeve having a first end and a second end, said first end of said first flexible sleeve sealingly connected to said end plate; a second flexible sleeve having a first end and a second end, said first end of said second flexible sleeve sealingly connected to said piston; and a swage assembly sealingly engaging the respective second ends of said first and second flexible sleeves.

The invention in another form is directed to a method of constructing a gas spring system, comprising: providing a gas spring system, including an end plate; a piston laterally spaced from said end plate; a first flexible sleeve having a first end and a second end, said first end of said first flexible sleeve sealingly connected to said end plate; a second flexible sleeve having a first end and a second end, said first end of said second flexible sleeve sealingly connected to said piston; and a swage assembly; aligning said first flexible sleeve and said second flexible sleeve at a desired bias angle; and swaging said swage assembly to fluidly join said first and second flexible sleeves by sealingly connecting the respective said second ends of the first and second flexible sleeves to said swage assembly.

An advantage of the present invention is that it provides a solution that does not require a double rolling lobe design.

Another advantage of the present invention is that is can be used in areas where small spaces may be a limitation.

Yet another advantage of the present invention is that is can be used to connect structures at different angles to one another.

Still another advantage of the present invention is that long bellows typically needed for the application are not necessary because of the more rigid upper flexible sleeve.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention in one form and such exemplification is not to be construed as limiting the scope of the invention in any manner.

DETAILED DESCRIPTION OF THE INVENTION

Figure 1:
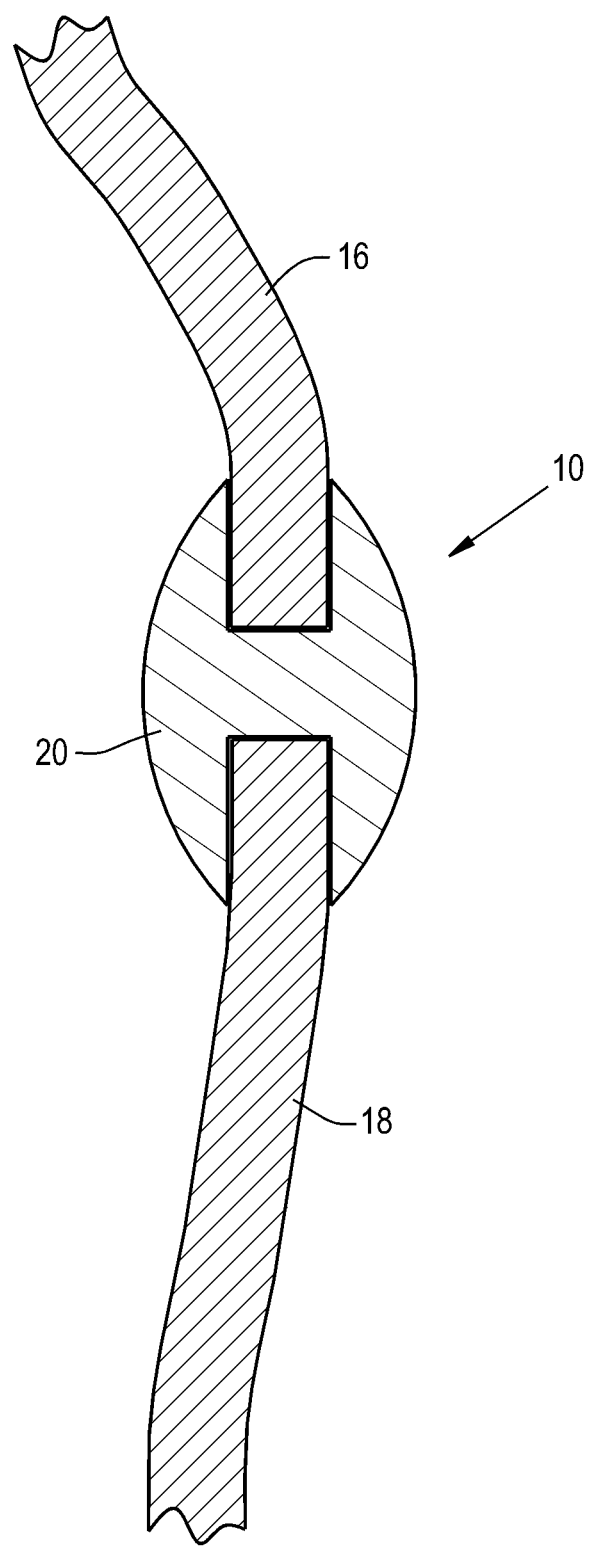
FIG. 1 is a cross-sectional view of the swage assembly.
Figure 2:
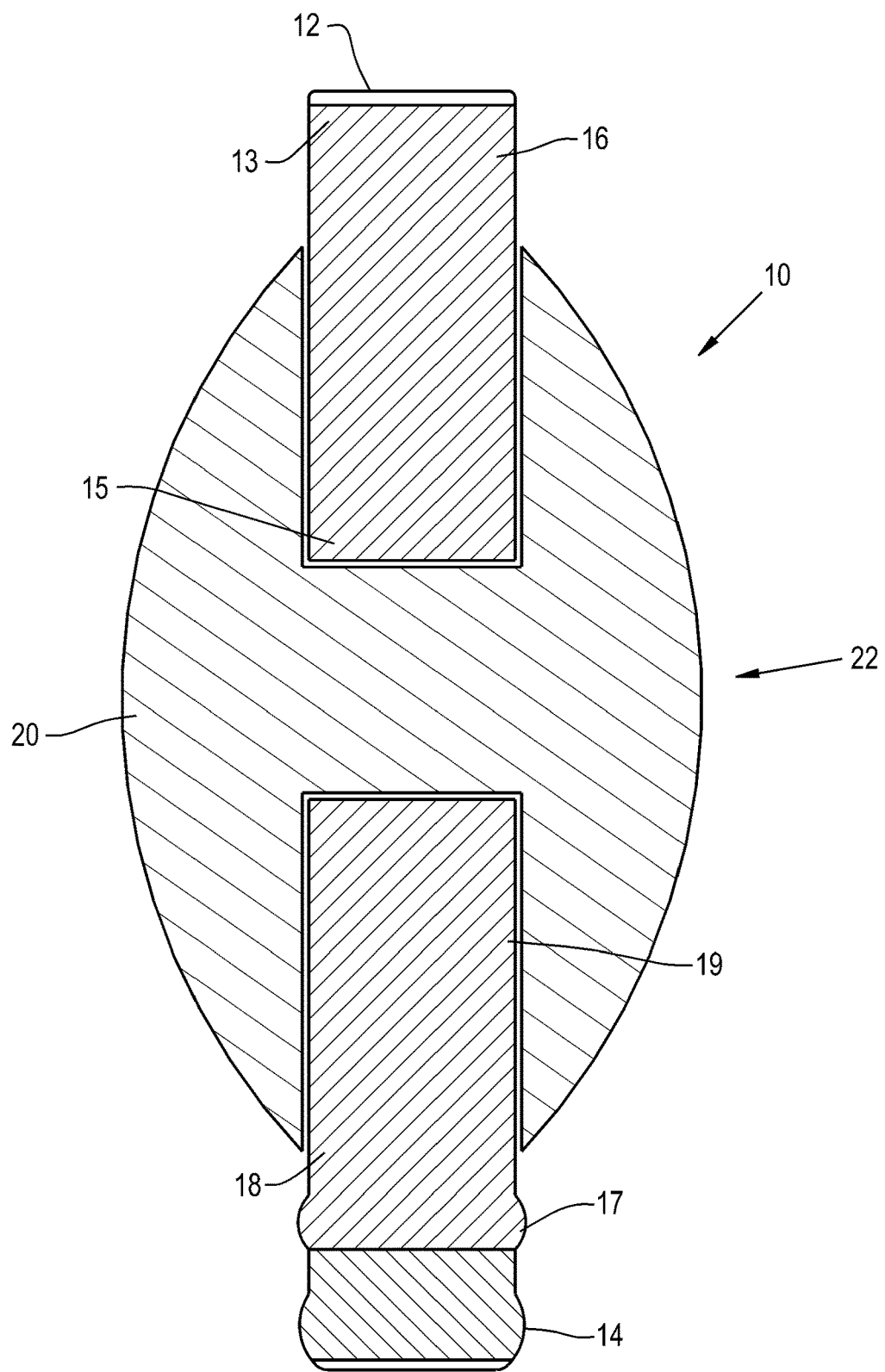
FIG. 2 is a cross-sectional view of the gas spring system of the present invention.

Referring now to the drawings, collectively to FIGS. 1 and 2, there is shown cross-sectional view of a gas spring system 10. Gas spring system 10 includes an end plate 12, a piston 14, a first flexible sleeve 16, a second flexible sleeve 18, and a swage assembly 20.

The first flexible sleeve 16 attaches at its top end to the end plate 12. The top plate 12 is disposed to receive the pressurized fluid. First flexible sleeve 16 can vary in its stiffness from being highly flexible to relatively rigid. The second flexible sleeve 18 attaches at its bottom end to the piston 14. Second flexible sleeve 18 is typically more flexible than first flexible sleeve 16, and is at least flexible enough to roll over piston 14. First flexible sleeve 16 can have the same thickness as second flexible sleeve 16, or the respective thicknesses may be different. In operation, then, the lower part of gas spring system 10 (enclosed by second flexible sleeve 18) is operable to directionally move a greater amount than the upper part of gas spring system 10 (enclosed by first flexible sleeve 16).

The swage assembly 20 connects the open ends of the first and second flexible sleeves 16, 18 such that at least one pressurized cavity 22 lies in between the end plate 12 and the piston 14 inside gas spring system 10. Swage assembly 20 can assist in containing second flexible material 18 as gas spring system 10 is compressed.

When swaged together by swage assembly 20, the first and second flexible sleeves 16, 18 may have different bias angles (as shown in FIG. 1) to achieve desired properties.

The end plate 12 and the piston 14 are composed of metal; yet any material, including polymers, may be used. The flexible sleeves 16, 18 can be made of an elastomeric material that can withstand many cycles of stretching and contracting, such as a rubber or polymer blend. Swage assembly 20 can be aluminum or any other metal or polymer suitable for the intended use and operating conditions.

Still referring to FIG. 2, construction of the gas spring system is as follows. First flexible sleeve 16 is sealingly attached to end plate 12 at first end 13. Second flexible sleeve 18 is attached to piston 14 at first end 17. Swage assembly 20 is then crimped or swaged onto respective ends 15, 19 of first flexible sleeve 16 and second flexible sleeve 18, thereby creating the at least one pressurized cavity 22 after assembly is completed.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gas spring system, comprising:
   an end plate;
   a piston laterally spaced from said end plate;
   a first flexible sleeve having a first end and a second end, said first end of said first flexible sleeve sealingly connected to said end plate, and said second end being open and having an outer circumferential surface;
   a second flexible sleeve having a first end and a second end, said first end of said second flexible sleeve sealingly connected to said piston, and said second end being open and having an outer circumferential surface; and
   a swage assembly sealingly engaging the respective second ends of said first and second flexible sleeves, wherein at least one pressurized cavity lies in between said end plate and said piston, and said swage assembly includes a body with a first receiving member for receiving said first flexible sleeve and a second receiving member for receiving said second flexible sleeve, said second receiving member being coaxial with said first receiving member, and said first receiving member surrounds said outer circumferential surface of said second end of said first flexible sleeve and said second receiving member surrounds said outer circumferential surface of said second end of said second flexible sleeve.

2. The gas spring system of claim 1, wherein said end plate is disposed to receive a pressurized fluid.

3. The gas spring system of claim 1, wherein said first and second flexible sleeves are made of an elastomeric material including rubber and a polymer blend.

4. The gas spring system of claim 1, wherein said swage assembly sealingly engages said first flexible sleeve and said second flexible sleeves each at a differing bias angle.

5. The gas spring system of claim 1, wherein said second flexible sleeve is more flexible than said first flexible sleeve.

6. The gas spring system of claim 1, wherein said first flexible sleeve is substantially rigid.

7. The gas spring system of claim 6, wherein said second flexible sleeve is substantially flexible.

8. The gas spring system of claim 1, wherein a volume within said second flexible sleeve moves a greater amount than a volume within said first flexible sleeve.

9. The gas spring system of claim 1, wherein said swage assembly at least partially contains said second flexible sleeve during compression of said gas spring system.

10. The gas spring system of claim 1, wherein said swage assembly surrounds and engages with said first and second flexible sleeves in a configuration which does not include a double rolling lobe design.

11. A method of constructing a gas spring system, comprising:
   providing a gas spring system, including:
      an end plate;
      a piston laterally spaced from said end plate;
      a first flexible sleeve having a first end and a second end, said first end of said first flexible sleeve sealingly connected to said end plate, and said second end being open and having an outer circumferential surface;
      a second flexible sleeve having a first end and a second end, said first end of said second flexible sleeve sealingly connected to said piston, and said second end being open and having an outer circumferential surface; and
      a swage assembly including a body with a first receiving member for receiving said first flexible sleeve and a second receiving member for receiving said second flexible sleeve, said second receiving member being coaxial with said first receiving member;
   aligning said first flexible sleeve and said second flexible sleeve at a desired bias angle; and swaging said swage assembly to fluidly join said first and second flexible sleeves by sealingly connecting the respective said second ends of the first and second flexible sleeves to said swage assembly so that said first receiving member surrounds said outer circumferential surface of said second end of said first flexible sleeve and said second receiving member surrounds said outer circumferential surface of said second end of said second flexible sleeve, wherein at least one pressurized cavity lies in between said end plate and said piston.

12. The method of claim 11, wherein said end plate is disposed to receive a pressurized fluid.

13. The method of claim 11, wherein said first and second flexible sleeves are made of an elastomeric material including rubber and a polymer blend.

14. The method of claim 11, wherein said swage assembly sealingly engages said first flexible sleeve and said second flexible sleeves each at a differing bias angle.

15. The method of claim 11, wherein said second flexible sleeve is more flexible than said first flexible sleeve.

16. The method of claim 11, wherein said first flexible sleeve is substantially rigid.

17. The method of claim 16, wherein said second flexible sleeve is substantially flexible.

18. The method of claim 11, wherein a volume within said second flexible sleeve moves a greater amount than a volume within said first flexible sleeve.

19. The method of claim 11, wherein said swage assembly at least partially contains said second flexible sleeve during compression of said gas spring system.

20. The method of claim 11, wherein said swage assembly surrounds and engages with said first and second flexible sleeves in a configuration which does not include a double rolling lobe design.

\* \* \* \* \*